(12) United States Patent  
Helin et al.

(10) Patent No.: US 8,310,959 B2  
(45) Date of Patent: Nov. 13, 2012

(54) VOICE COMMUNICATION WITH ANY OF MULTIPLE TERMINALS

(75) Inventors: Markku Helin, Kaunianinen (FI); Tommi Auvinen, Vantaa (FI); Arto Keskiniva, Parvoo (FI)

(73) Assignee: SAP AG, Walldorf (DE)

( * ) Notice: Subject to any disclaimer, the term of this patent is extended or adjusted under 35 U.S.C. 154(b) by 989 days.

(21) Appl. No.: 12/347,282

(22) Filed: Dec. 31, 2008

(65) Prior Publication Data

US 2010/0165890 A1 Jul. 1, 2010

(51) Int. Cl.  
*H04Q 11/00* (2006.01)

(52) U.S. Cl. ..... 370/259; 370/352; 370/493; 379/93.01; 379/201.01

(58) Field of Classification Search .................. None  
See application file for complete search history.

(56) References Cited

U.S. PATENT DOCUMENTS

| 5,974,120 | A  | * | 10/1999 | Katz | 379/93.13 |
| 2003/0126615 | A1 | * | 7/2003 | Fukada | 725/111 |
| 2005/0018833 | A1 | * | 1/2005 | Wang et al. | 379/215.01 |
| 2010/0158232 | A1 | * | 6/2010 | Sylvain | 379/202.01 |

FOREIGN PATENT DOCUMENTS

EP 1349357 10/2003

OTHER PUBLICATIONS

European Search Report for Application No. EP 09015965.8-2413, dated May 10, 2010, 6 pages.

* cited by examiner

*Primary Examiner* — Chi H. Pham  
*Assistant Examiner* — Shick Hom  
(74) *Attorney, Agent, or Firm* — Fish & Richardson P.C.

(57) ABSTRACT

Among other disclosed subject matter, a computer-implemented method for handling a voice communication in an integrated system includes receiving information indicating that a voice communication between a first party and a second party is to be initiated. The method includes identifying one of a plurality of terminal assignment records as being associated with the second party, each of the terminal assignment records configured to specify, for a particular party, at least one of a plurality of terminal units for receiving an alert to the particular party regarding the voice communication. The method includes generating at least one alert to the second party according to the identified terminal assignment record, the alert based on the received information. The method includes forwarding communication data to an application program available to the second party, the communication data obtained from the received information.

26 Claims, 3 Drawing Sheets

VOICE COMMUNICATION WITH ANY OF MULTIPLE TERMINALS

TECHNICAL FIELD

This document relates to voice communication.

BACKGROUND

Organizations can use business application programs to handle customer contact or to coordinate information and activities needed to complete business processes such as order fulfillment or billing. An organization's staff may access such information at personal computer terminals. Some organizations are moving into new generation communication technologies, including Voice Over Internet Protocol (VoIP) and software based communication software (personal computer softphones).

Some user groups may not feel comfortable using personal computer (PC) softphones or may work in environments that are unsuitable for softphone use, but still require voice communication integration with business applications. For example, a user's PC may not have sufficient resources for softphone usage, a user's workstation may be a thin-client (e.g., Citrix) that does not support softphones, or a user may work in an environment where the data connection quality is not adequate for transmitting voice communications with a softphone. Further, organizations can require mobility for staff that need such integration. Additionally, changing to new generation communication technologies causes great disruption. For example, sometimes all users must change to the new communication technology or switch to a new communication device at the same time. Organizations often require a single type of communication device for integration, which may not suit all end users.

SUMMARY

The invention relates to voice communication with any of multiple terminals.

In a first aspect, a computer-implemented method for handling a voice communication in an integrated system includes receiving information indicating that a voice communication between a first party and a second party is to be initiated. The method includes identifying one of a plurality of terminal assignment records as being associated with the second party, each of the terminal assignment records configured to specify, for a particular party, at least one of a plurality of terminal units for receiving an alert to the particular party regarding the voice communication. The method includes generating at least one alert to the second party according to the identified terminal assignment record, the alert based on the received information. The method includes forwarding communication data to an application program available to the second party, the communication data obtained from the received information.

Implementations can include any or all of the following features. The first terminal unit receiving an alert can include the application program and be configured so that the second party can answer the voice communication using the first terminal unit and at the same time access the communication data using the first terminal unit. The method can further include initiating the voice communication between the first party and the second party, wherein the second party communicates using a first terminal unit receiving the alert. A second terminal unit receiving the alert can include the application program, where the second party answers the voice communication using the first terminal unit independently of the second terminal unit, and where the second terminal unit is configured so that the second party can access the communication data using the second terminal unit independently of the first terminal unit. The method can further include receiving an answer signal from an answering terminal unit receiving the alert, where the answer signal is initiated by the second party, and in response to receiving the answer signal, initiating the voice communication between the answering terminal unit and the first party. The method can further include forwarding a voice communication signal to both the application program and a terminal unit independent of the application program, the voice communication signal comprising at least part of the voice communication between the first party and the second party.

In a second aspect, a computer program product is tangibly embodied in a computer-readable storage medium and includes instructions that when executed by a processor perform a method for handling a voice communication in an integrated system. The method includes receiving information indicating that a voice communication between a first party and a second party is to be initiated. The method includes identifying one of a plurality of terminal assignment records as being associated with the second party, each of the terminal assignment records configured to specify, for a particular party, at least one of a plurality of terminal units for receiving an alert to the particular party regarding the voice communication. The method includes generating at least one alert to the second party according to the identified terminal assignment record, the alert based on the received information. The method includes forwarding communication data to an application program available to the second party, the communication data obtained from the received information.

Implementations can include any or all of the following features. The first terminal unit receiving an alert can include the application program and be configured so that the second party can answer the voice communication using the first terminal unit and at the same time access the communication data using the first terminal unit. The method can further include initiating the voice communication between the first party and the second party, where a second terminal unit receiving the alert includes the application program, where the second party answers the voice communication independently of the second terminal unit using a first terminal unit receiving the alert, and where the second terminal unit is configured so that the second party can access the communication data using the second terminal unit independently of the first terminal unit.

In a third aspect, a system for handling a voice communication in an integrated system includes a plurality of terminal units operable to receive an alert regarding a voice communication, each of the terminal units configured for use in the voice communication. The system includes a server device including: an interface to a voice communication network, the interface receiving information indicating that the voice communication between a first party and a second party is to be initiated; a plurality of terminal assignment records, each associated with an individual party, wherein the server device identifies, in response to the information, at least one of the plurality of terminal assignment records as being associated with the second party, each terminal assignment record configured to specify, for the individual party, a party-specific plurality of terminal units from the plurality of terminal units, each for receiving an alert to the particular party regarding the voice communication; and an interface to the plurality of terminal units configured for transmitting at least one alert to the second party according to the identified terminal assignment record, the alert based on the received information, and for forwarding communication data to an application program available to the second party, the communication data obtained from the received information.

Implementations can include any or all of the following features. The interface to the plurality of terminal units can be operable to receive packetized voice information from a first terminal unit from the second party's party-specific plurality of terminal units and depacketized voice information from a second terminal unit from the second party's party-specific plurality of terminal units. A first terminal unit can include the application program and the second party can answer the voice communication using a second terminal unit. The second terminal unit can include a mobile communication device communicating to the interface to the plurality of terminal units through a public switched telephone network. The server device can further include a server program, and the application program can be a client program corresponding to the server program. The application program can be configured so that the second party may select the second party's party-specific plurality of terminal units from a plurality of terminal units. A first terminal unit receiving an alert transmitted by the interface can include the application program and be configured so that the second party can answer the voice communication using the first terminal unit and at the same time access the communication data using the first terminal unit. The server device can further be configured to initiate the voice communication between the first party and the second party, wherein the second party communicates using a first terminal unit receiving a first alert transmitted by the interface. A second terminal unit receiving a second alert transmitted by the interface can include the application program, wherein the second party answers the voice communication using the first terminal unit independently of the second terminal unit, and wherein the second terminal unit is configured so that the second party can access the communication data using the second terminal unit independently of the first terminal unit. The server device can further be configured to receive an answer signal from an answering terminal unit receiving an alert transmitted by the interface, where the answer signal is initiated by the second party, and in response to receiving the answer signal, initiate the voice communication between the answering terminal unit and the first party. One or more terminal units can be configured to send outgoing information indicating that an outgoing voice communication between the second party and the first party is to be initiated, and the server device can be configured to forward outgoing communication data to the application program available to the second party, the outgoing communication data obtained from the outgoing information.

In a fourth aspect, a computer-implemented method for handling a voice communication in an integrated system includes receiving information indicating that a voice communication between a first party and a second party is to be initiated. The method includes identifying one of a plurality of terminal assignment records as being associated with the second party, each of the terminal assignment records configured to specify, for a particular party, at least one of a plurality of terminal units for receiving communication data obtained from the received information. The method includes generating at least one alert to the first party. The method includes forwarding the communication data to an application program available to the second party.

In implementations, the second party can initiate the voice communication using a first terminal unit independently of a second terminal unit that that receives the communication data and includes the application program, and the second terminal unit can be configured so that the second party can access the communication data using the second terminal unit independently of the first terminal unit.

Advantageously, the described subject matter may provide for one or more benefits, such as enabling the integration of business application programs into an existing voice communication system. End users may get increased flexibility while continuing to use their existing deskphones. Further, the system enables a smooth migration, user-by-user into new technology devices. For example, a variety of types of voice communication devices may be used. End users need not use a softphone if they are uncomfortable with the softphone, are not near a personal computer terminal containing the softphone, or if the PC terminal does not or cannot provide a softphone. End users may answer voice communications using mobile telephones and still receive some benefits of call integration with business application programs. For example, mobile and home workers may participate in the business process.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples of handling a voice communication in an integrated system including multiple parties and multiple terminal units. In some implementations, a first party may initiate a voice communication to be conducted with a second party over a voice communication network. A server device may receive the voice communication information and send an alert to each of a plurality of terminal units associated with the second party. The second party may answer the voice communication using any of the multiple terminal units. The server device may forward communication data associated with the voice communication to an application program. In some implementations, a terminal unit receiving an alert includes the application program.

Figure 1:
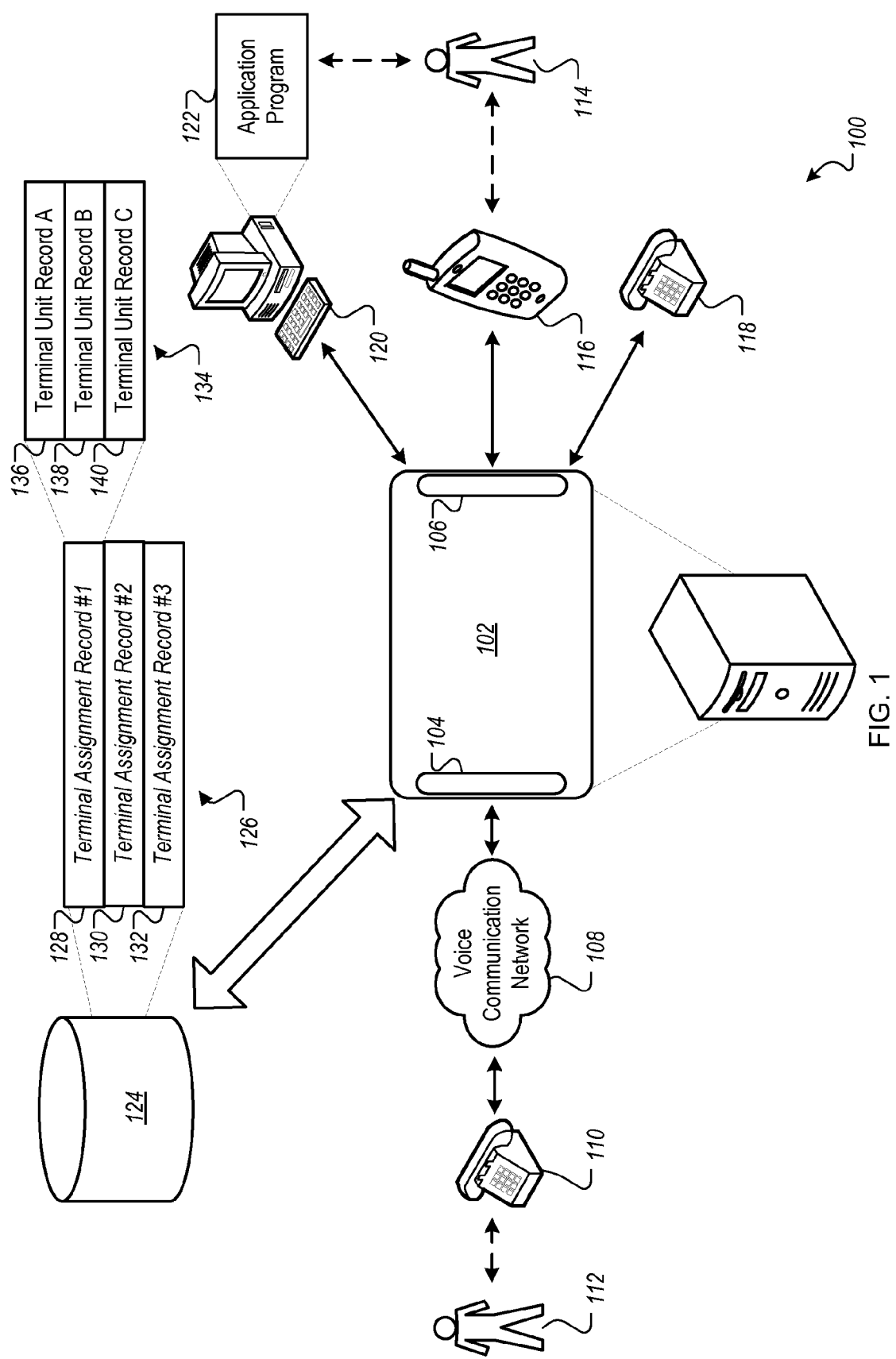
FIG. 1 is a diagram of an example integrated system 100 for handling a voice communication.

FIG. 1 is a diagram of an example integrated system 100 for handling a voice communication. The system 100 may include a server device 102 that includes an interface 104 to a voice communication network and an interface 106 to a plurality of terminal units (e.g., terminal units 120, 116, and 118). A first party 112 may attempt to initiate a voice communication with a second party 114. The first party 112 may use a voice communication device 110 to connect to the server device 102 through a voice communication network 108.

In some implementations, when a voice communication is initiated, the server device 102 may search a database 124 to identify terminal units associated with the second party for receiving an alert signal or for initiating the voice communication. The database 124 may identify a terminal assignment record 128 from a plurality of terminal assignment records 126 that is associated with the second party 114. The terminal assignment record 128 may identify a plurality of terminal assignment records 134. Each terminal assignment record may identify or be associated with a terminal unit associated with the second party. The server device 102 may connect to terminal units (e.g., terminal units 120, 116, and 118) through the interface 106. The server device 102 may alert each of the terminal units associated with the plurality of terminal unit records 134 of the attempt to initiate the voice communication. For example, the server device can generate corresponding alert signals for each of the respective terminal units 116-120.

In some implementations, the second party 114 may answer the voice communication using any of the terminal units, such as with the terminal unit 116. The server device 102 may forward communication data associated with the voice communication to an application program 122 within a terminal unit 120. The second party 114 may view the communication data using the application program 122 and answer the voice communication using the terminal 116 at the same time.

First party 112 may include an individual desiring to communicate with a second party 114. The first party 112 may use a voice communication device 110 to initiate a voice communication with the second party 114. For example, the communication device 110 may include a traditional analog telephone, a digital telephone, a cellular telephone, a voice over internet protocol telephone, a computer phone (softphone), etc. The communication device 110 may transmit other sounds or video in addition to or instead of the voice communication. In some implementations, the communication device 110 operates independently of a first party. For example, the communication device 110 may connect instead to a source communication device or may itself initiate the voice communication.

The communication device 110 may transmit information indicating a readiness or willingness of the communication device 110 to establish a voice communication with another communication device. The information may indicate an individual or device to attempt a connection with. For example, the information may be a communication address (e.g., a public switched telephone network (PSTN) number, an IP address, an email address, or a username).

The information may include an analog voltage level, electrical pulses, or a digital code, to name a few possibilities. For example, the information may include tones indicating a phone number, pulses indicating a phone number, a session initiation protocol (SIP) invite code, etc. In other implementations, the information may include analog or digital voice or communication information. The information may be compressed or packetized.

The communication device 110 may connect to a voice communication network 108. The voice communication network 108 may include a PSTN, the Internet, a metropolitan area network, a local area network, or a private branch exchange. The voice communication network 108 may communicate using analog signals, digital signals, or both. In some implementations, the voice communication network 108 may include a circuit switched network. In other implementations, the voice communication network 108 may include a packet switched network. The voice communication network may include several different networks.

The voice communication network 108 is here connected to the server device 102. In some implementations, the server device may include an interface 104 for connecting the network 108 to the server device 102. The interface 104 may include a physical or logical interface. For example, a physical interface may include one or more Ethernet ports, fiber optic ports, usb ports, firewire ports, RJ45 ports, RJ11 ports, RJ25 ports, RJ48 ports, RJ12 ports, RJ 21 ports, or PSTN ports. The ports may include either female or male plugs or terminals and may include parallel or serial communication.

In some implementations, the interface 104 may include a logical interface. The interface 104 may convert or relay information from the voice communication network 108 into a format or protocol understood or readily handled by the server device 102. For example, information from the voice communication network 108 may arrive as an analog signal and the interface 104 may convert the signal to a digital signal. The interface 104 may be a softswitch. The interface 104 may be a gateway.

In some implementations, the server device 102 may process the information and route the information, associated information, or an alert to a terminal unit from a plurality of terminal units. The server device may include or connect to a database 124 to determine terminal units to send further information to. For example, database 124 may include a plurality of terminal assignment records 126 (e.g., terminal assignment records 128, 130, and 132).

In some implementations, the server device 102 may identify a subset plurality of terminal assignment records as associated with a service pool or a queue of terminal units. The server device 102 may select one or more terminal assignment records from the subset plurality. In other implementations, the server device 102 may select a single assignment record not based upon a service pool or queue but upon the received communication address.

In some implementations, a terminal assignment record may indicate a party associated with one or more terminal units. For example, terminal assignment record 128 may be associated with or indicate the second party 114, such as by the second party 114 having created or provided the input for the record. The terminal assignment record 128 may include an identifier referring to the second party 114 (e.g., a name or a reference number). The identifier may be the same as the received communication address or refer to the received communication address. In other implementations, a terminal assignment record may be associated with a terminal unit or a group of terminal units.

In some implementations, each terminal assignment record may include or be associated with one or more terminal unit records. For example, the terminal assignment record 128 is associated with a plurality of terminal unit records 134 (e.g., terminal unit records 136, 138, and 140). A terminal unit record may indicate or be associated with, such as by identifying, a terminal unit. For example, terminal unit record 136 may indicate terminal unit 120, terminal unit record 138 may indicate terminal unit 116, and terminal unit record 140 may indicate terminal unit 118.

In some implementations, the plurality of terminal unit records 134 may constitute a subset of terminal unit records selected from a larger plurality of terminal unit records. For example, the larger plurality may include terminal unit records associated with each of the plurality of terminal assignment records 126. In another example, the subset of terminal unit records (e.g., plurality 134) may indicate the terminal units that second party 114 has chosen to receive an alert. That is, from a larger group of available terminal units, the second party 114 may have selected a smaller set based on which devices the second party prefers to be used for receiving alerts about incoming voice communications.

The server device 102 may include an interface 106 for connecting or communicating with a plurality of terminal units. The interface 106 may provide alerts to terminal units indicating that the first party desires to initiate a voice communication. In some implementations, the interface 106 may include a physical or logical interface and may perform functions similar to or the same as the interface 104. In other implementations, the interface 106 may connect to a terminal unit through a PSTN.

In other implementations, the interface 106 may serve to standardize control signals from a variety of types of terminal units. For example, the server unit 102 may process information, voice signals, and communication signals transmitted to and from a plurality of terminal units, such as terminal units 120, 116, and 118. As an example, terminal unit 120 may communicate with the server unit 102 using SIP protocol signals and terminal unit 118 may communicate with the server unit 102 using traditional analog telephone signals. The interface 106 may standardize the received signals into a common format understood by the server device 102.

The terminal units connected to the interface 106 (e.g., terminal units 120, 116, and 118) may include any or all of a variety of types of terminal units. All kinds of telephone terminals may connect to the interface 106 and communicate through or to server device 102. This includes softphones, IP deskphones, digital deskphones, analog deskphones, mobile telephones, etc.

For example, terminal unit 118 may include a deskphone, terminal unit 116 may include a mobile telephone, and terminal unit 120 may include a computer. The computer may include a softphone (e.g., a softphone application program that permits the second party 114 to communicate with the first party through a microphone and speakers connected to the computer). The application program 122 may include the softphone application program. Application program 122 may be distinct from the softphone application program.

In some implementations, the server device 102 may send or transmit an alert to a plurality of terminal units associated with a second party. The plurality of terminal units may include the terminal units indicated in the plurality of terminal unit records 134. For example, the terminal units 120, 116 and 118 may receive alerts indicating that the first party desires to initiate a voice communication. The alerts may be terminal unit specific and indicate to the second party that a first party desires to initiate a voice communication. For example, the deskphone 118 may ring, the mobile phone 116 may play a ringtone, and the computer 120 may beep or visibly indicate the presence of an alert.

The second party 114 may answer the alert using a terminal unit. For example, the second party 114 may press a button on the mobile phone 116, click a button or type a key on the computer, or lift up the receiver of the deskphone. Answering the alert may include sending a signal to the interface 106, the server device 102, the voice communication network, 108, the communication device 110, or the first party 112.

In some implementations, the server device 102 forwards communication data to an application program. The communication data may include the information indicating a readiness or willingness of the communication device 110 to establish the voice communication or a portion thereof, similar information generated by the server 102, the voice communication itself, statistics on the voice communication, etc.

For example, the information may include an identification number associated with the communication device 110, a time of an initiation of the voice communication, a length of the voice communication, a time of a termination of the voice communication, audio or video associated with the voice communication, etc. The information may include information associated with the first party 112 such as information about past voice communications with the first party 112, information about purchases of the first party 112 of products or services of a company associated with the second party 114, notes entered by another party associated with the company about the first user, etc.

The application program including the communication data may be accessible to the second party 114 and may reside within a terminal unit. The application program may be the application program 122. In some implementations, the application program 122 includes enterprise resource planning software or customer relationship management (CRM) software. The application program 122 may include a client program and the server device 102 may include an associated server program. The application program 122 may store the communication data or derivatives of the data. The second party 114 may view or modify the communication data.

In some implementations, the application program or the computer 120 may permit the second party 114 to define which terminal units from a larger plurality of terminal units should receive alerts. For example, the second party may use the application program 122 to indicate that the terminals 120, 116, and 118 should receive an alert. The terminal assignment record 128 may then update the plurality of terminal unit records 134 accordingly. The system 100 may permit the second party to identify the selected terminal units with a PSTN number of a device connected through the PSTN or various formats of numbers for a device connected through the internet (e.g., a Skype username, a PSTN number, an email address, etc.).

In some implementations, the application program may reside within a terminal unit and receive information independently of which terminal unit the second party uses to answer the voice communication. For example, the second party may answer the voice communication on the mobile phone 116 while in his car. Had the party been at work he could have answered the voice communication using a softphone on computer 120. A terminal unit answering a voice communication may not communicate with the application program in any way. The server device 102 may provide the only indication to the application program 120 that a voice communication was initiated.

The application program 122 may operate to receive communication data identifying the length of the voice communication (or call), who called, the content of the call, etc. The second party 114 may later access this information at computer 120 or using the application program 122. In some implementations, the information received by the application program 122 may not be received by the mobile phone 116 (i.e., the server device splits the voice communication from data associated with the voice communication and forwards the information and the voice communication to the appropriate terminal unit. In other implementations, more than one application program exist and record information.

In some implementations, the second party 114 may use one or more terminal units to initiate outgoing voice communications that include outgoing information through the server device 102 (in contrast to an incoming call initiated by the first party 112 using the communication device 110). For example, the second party 114 may initiate a call to the first party 112 using the terminal unit 116 independently of the terminal unit 120. For instance, the terminal unit 116 may be a mobile phone and the second party 114 may attempt to call the first party 112 using the mobile phone 116. The server device 102 may receive information from the mobile phone or an intermediate device indicating that a voice communication between the second party 114 and the first party 112 is to be initiated.

The server device 102 may identify the terminal assignment record 128 as associated with the second party 114 or the mobile phone 116 that initiated the voice communication. The terminal assignment record 128 may identify or be configured to specify the terminal unit record 136 or the associated terminal unit 120 (e.g., a PC) for receiving communication data. The server device 102 may forward communication data associated with the voice communication or obtained from the received information to the PC 120, and more particularly the application program 122. The server device 102 may generate an alert to the first party 112 indicating that the second party 114 is initiating the voice communication. The generated alert may include a signal transmitted to the voice communication network 108.

In one illustration, the second party 114 may initiate the voice communication using the mobile phone 116 independently of the PC 120. For instance, the second party 114 may initiate the voice communication while away from an office where the PC 120 is located. Further, the second party 114 may access the communication data forwarded to the PC 120 using the PC 120 independently of the mobile phone 116. For instance, the second party may have left the mobile phone at home or have even destroyed the mobile phone, but may still view the communication data on the PC (e.g., a log of calls placed and received on the mobile phone). The system 100 may perform operations similar to those required for an incoming voice communication but in reverse. For example, the interface 104 may convert a digital signal used by the server device 102 to an analog signal used by a PSTN included within the voice communication network 108.

In other implementations, a voice communication signal is sent to both the terminal unit 120 including the application program 122 and the terminal unit 116. For example, the second party may answer the voice communication and communicate with the first party 112 using the terminal unit 116. The voice communication signal may include a representation of the first party's voice. The application program 122 and the second party 114 may both receive the voice communication signal. The application program 122 may record the voice communication signal.

Figure 2:
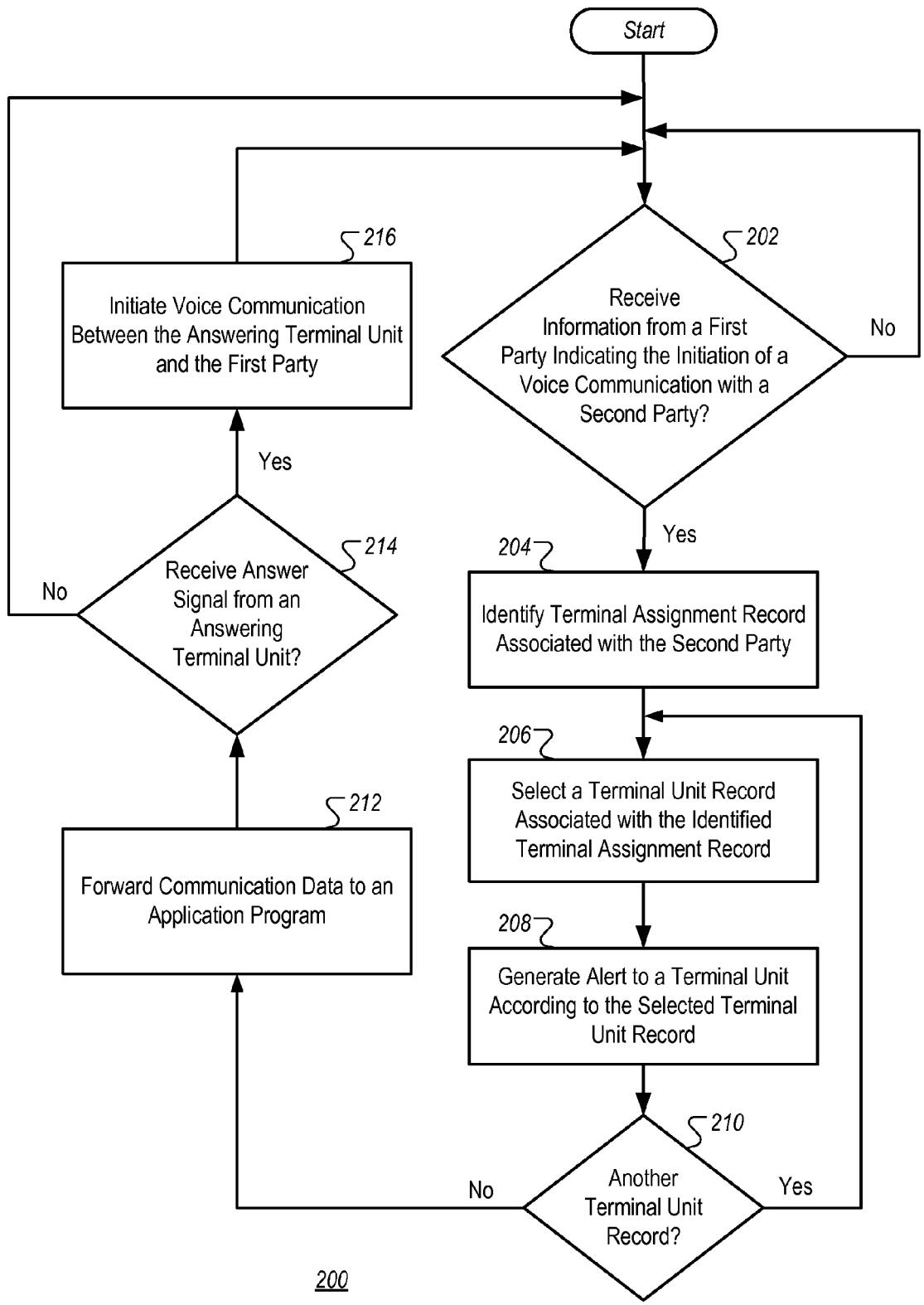
FIG. 2 is a flow chart of an example process 200 for handling a voice communication in an integrated system.

FIG. 2 is a flow chart of an example process 200 that can be used for handling a voice communication in an integrated system. The process 200 may be performed, for example, by a processor executing instructions stored in a computer-readable medium, such as in the system in FIG. 1. For clarity of presentation, the description that follows uses the system in FIG. 1 as the basis of an example for describing the process. In some implementations, however, another system or combination of systems may be used to perform the process 200.

Step 202 includes determining whether information is received from a first party, the information indicating an attempt to establish a voice communication with a second party. For example, the server device 102 may receive such information from the voice communication network 108, possibly originating from the communication device 110. If the information is received, the operation of step 204 is performed. If the information is not received, the determination of step 202 is here performed again.

Step 204 involves identifying a terminal assignment record that is associated with the second party. In some implementations, a plurality of terminal assignment records may be searched to identify a single record that identifies or is otherwise associated with the second party. For example, the server device 102 may search the plurality of terminal assignment records 126 for a terminal assignment record associated with the second party 114. The server device 102 may identify terminal assignment record 128 as associated with the second party 114.

Step 206 involves selecting a terminal unit record that is associated with the identified terminal assignment record. The terminal assignment record may associate with or include several such terminal assignment records. For example, the server device 102 may select terminal unit record 136 from the plurality of terminal unit records 134 associated with the terminal assignment record 128.

Step 208 involves generating an alert to a terminal unit associated with the selected terminal unit record. For example, the terminal unit 120 may be associated with terminal unit record 136. The system 102 may generate an alert to the terminal unit 120, which itself may alert the second party 114 or initiate the voice communication.

Step 210 involves determining whether the identified terminal assignment record is associated with another terminal unit record that has not been selected for the operation of steps 206 through 210. For example, the system 102 may determine that the operations of steps 206 through 210 have not been performed for the terminal unit records 138 or 140 associated with the identified terminal assignment record 128. If another terminal unit record has not been selected for the operation of steps 206 through 210, the operations of these steps is performed for the terminal unit. If there is no such other terminal record, the operation of step 212 is performed.

Step 212 involves forwarding communication data to an application program. The communication data may be obtained from the received information indicating an attempt to establish a voice communication. For example, the server 102 may forward communication data to an application program 122 associated with or included within the terminal unit 120. In some implementations, the application program 122 can include a CRM application. The communication data may include the communication data referred to in the discussion of FIG. 1.

Step 214 involves determining whether an answer signal is received from an answering terminal unit. The answering terminal unit may include any or all terminal units to which an alert was generated. For example, the server device 102 may determine that an answer signal generated by the terminal unit 116 is received. The second party 114 may cause the terminal unit 116 to generate the answer signal (e.g. the second party picks up the phone or presses the "answer" button). If an answer signal is received, the operation of step 216 is performed. If no answer signal is received the process 200 starts over and the determination of step 202 is performed.

Step 216 involves initiating voice communication between the answering terminal unit and the first party. For example, the server device 102 may initiate voice communication between the terminal unit 116 and the first party 112. The communication device 110, voice communication network 108, interface 104 and interface 106 may be involved in initiating the voice communication. In some implementations, the communication data received by a CRM application can be used to present information that relates to the voice communication, for example by launching the CRM application, obtaining CRM data about the caller and presenting the data to the party for reference during the communication.

Figure 3:
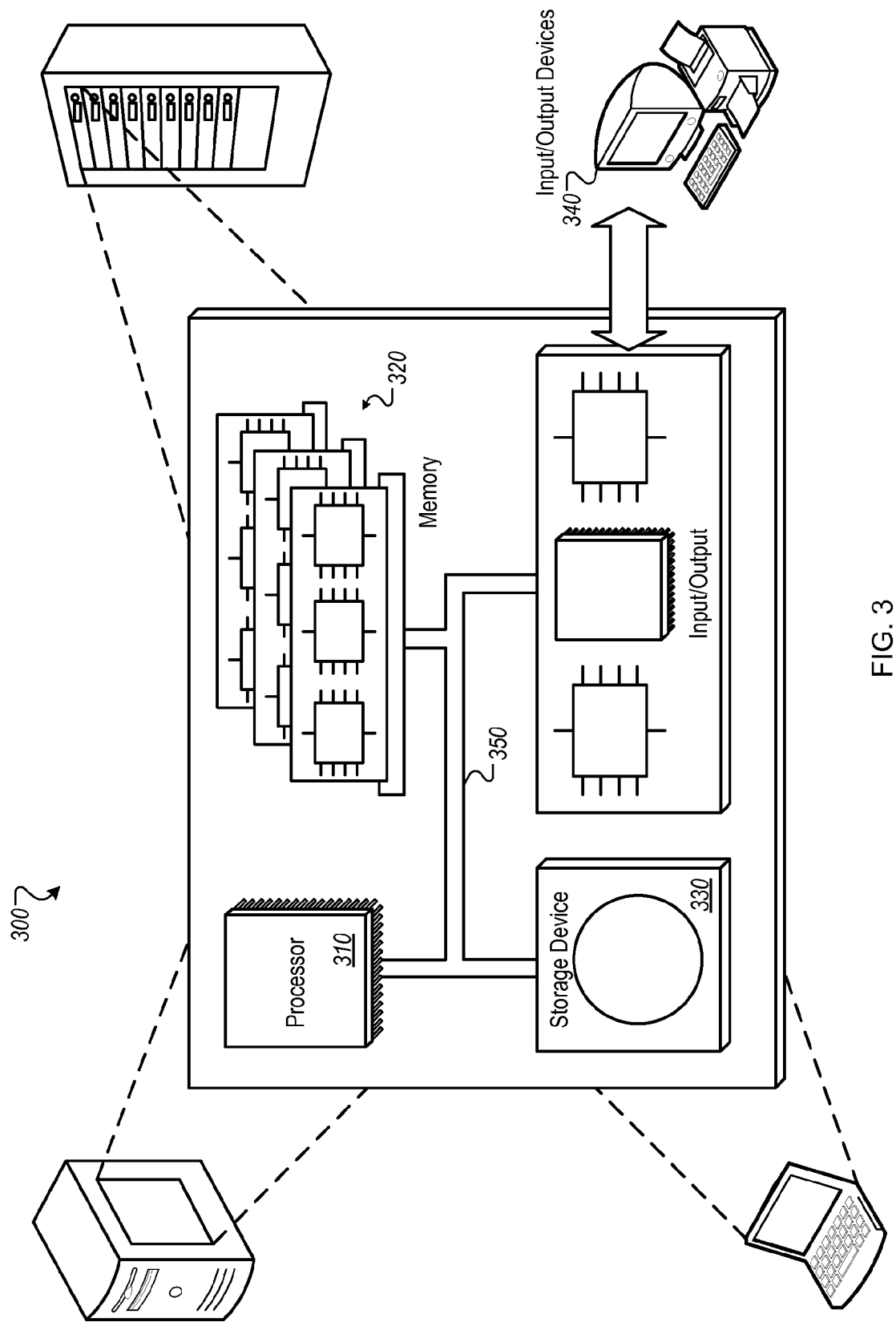
FIG. 3 is a schematic diagram of a generic computer system 300.

FIG. 3 is a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for handling a voice communication in an integrated system and between a first party and a second party, the method comprising:
    receiving information indicating that the voice communication is to be initiated;
    identifying one of a plurality of terminal assignment records as being associated with the second party, each of the terminal assignment records configured to specify, for a particular party, at least one of a plurality of terminal units for receiving an alert to the particular party regarding the voice communication;
    generating at least one alert to the second party according to the identified terminal assignment record, the at least one alert based on the received information;
    forwarding communication data to an application program available to the second party, the communication data obtained from the received information; and
    forwarding a voice communication signal to both the application program and a terminal unit that is from the plurality of terminal units and that is independent of the application program, the voice communication signal comprising at least part of the voice communication between the first party and the second party.

2. The computer-implemented method of claim 1, wherein a first terminal unit receiving the at least one alert includes the application program and is configured so that the second party can answer the voice communication using the first terminal unit and at the same time access the communication data using the first terminal unit.

3. The computer-implemented method of claim 1, further comprising initiating the voice communication between the first party and the second party, wherein the second party communicates using a first terminal unit receiving the at least one alert.

4. The computer-implemented method of claim 3, wherein a second terminal unit receiving the at least one alert includes the application program, where the second party answers the voice communication using the first terminal unit independently of the second terminal unit, and where the second terminal unit is configured so that the second party can access the communication data using the second terminal unit independently of the first terminal unit.

5. The computer-implemented method of claim 1, further comprising receiving an answer signal from an answering terminal unit receiving the at least one alert, where the answer signal is initiated by the second party, and in response to receiving the answer signal, initiating the voice communication between the answering terminal unit and the first party.

6. A computer program product tangibly embodied in a non-transitory computer-readable storage medium and comprising instructions that when executed by a processor perform a method for handling a voice communication in an integrated system and between a first party and a second party, the method comprising:
    receiving information indicating that the voice communication is to be initiated;
    identifying one of a plurality of terminal assignment records as being associated with the second party, each of the terminal assignment records configured to specify, for a particular party, at least one of a plurality of terminal units for receiving an alert to the particular party regarding the voice communication;
    generating at least one alert to the second party according to the identified terminal assignment record, the at least one alert based on the received information;
    forwarding communication data to an application program available to the second party, the communication data obtained from the received information,
    wherein a first terminal unit receiving the at least one alert includes the application program and is configured so that the second party can answer the voice communication using the first terminal unit and at the same time access the communication data using the first terminal unit.

7. The computer program product of claim 6, wherein the method further comprises initiating the voice communication between the first party and the second party, where a second terminal unit receiving the at least one alert includes the application program, where the second party answers the voice communication independently of the second terminal unit using the first terminal unit receiving the at least one alert, and where the second terminal unit is configured so that the second party can access the communication data using the second terminal unit independently of the first terminal unit.

8. A system for handling a voice communication in an integrated system and between a first party and a second party, the system comprising:
    a server device including:
        an interface to a voice communication network, the interface configured to receive information indicating that the voice communication is to be initiated;
        a plurality of terminal assignment records, each associated with an individual party, wherein the server device is configured to identify, in response to receiving the information, at least one of the plurality of terminal assignment records as being associated with the second party, each terminal assignment record configured to specify, for the individual party, a party-specific plurality of terminal units from a plurality of terminal units that are operable to receive alerts regarding voice communications and that are configured for use in the voice communications, each of the party-specific plurality of terminal units for receiving an alert to the individual party regarding the voice communication, wherein one or more terminal units of the plurality of terminal units are configured to send outgoing information indicating that an outgoing voice communication between the second party and the first party is to be initiated; and
        an interface to the plurality of terminal units configured for transmitting at least one alert to the second party according to the identified terminal assignment record, the at least one alert based on the received information, and for forwarding communication data to an application program available to the second party, the communication data obtained from the received information,
        wherein the server device is configured to forward outgoing communication data to the application program available to the second party, the outgoing communication data obtained from the outgoing information.

9. The system of claim 8, wherein the interface to the plurality of terminal units is operable to receive packetized voice information from a first terminal unit from the second party's party-specific plurality of terminal units and depacketized voice information from a second terminal unit from the second party's party-specific plurality of terminal units.

10. The system of claim 8, wherein a first terminal unit includes the application program and the second party answers the voice communication using a second terminal unit.

11. The system of claim 10, wherein the second terminal unit includes a mobile communication device communicating to the interface to the plurality of terminal units through a public switched telephone network.

12. The system of claim 8, wherein the server device further includes a server program, and wherein the application program is a client program corresponding to the server program.

13. The system of claim 8, wherein the application program is configured so that the second party may select the second party's party-specific plurality of terminal units from the plurality of terminal units.

14. The system of claim 8, wherein a first terminal unit receiving the at least one alert transmitted by the interface includes the application program and is configured so that the second party can answer the voice communication using the first terminal unit and at the same time access the communication data using the first terminal unit.

15. The system of claim 8, wherein the server device is further configured to initiate the voice communication between the first party and the second party, wherein the second party communicates using a first terminal unit receiving a first alert transmitted by the interface.

16. The system of claim 15, wherein a second terminal unit receiving a second alert transmitted by the interface includes the application program, wherein the second party answers the voice communication using the first terminal unit independently of the second terminal unit, and wherein the second terminal unit is configured so that the second party can access the communication data using the second terminal unit independently of the first terminal unit.

17. The system of claim 8, wherein the server device is further configured to receive an answer signal from an answering terminal unit receiving the at least one alert transmitted by the interface, where the answer signal is initiated by the second party, and in response to receiving the answer signal, initiate the voice communication between the answering terminal unit and the first party.

18. A computer-implemented method for handling a voice communication in an integrated system and between a first party and a second party, the method comprising:
receiving information indicating that the voice communication is to be initiated;
identifying one of a plurality of terminal assignment records as being associated with the second party, each of the terminal assignment records configured to specify, for a particular party, at least one of a plurality of terminal units for receiving communication data obtained from the received information;
generating at least one alert to the first party; and
forwarding the communication data to an application program available to the second party,
wherein the second party initiates the voice communication using a first terminal unit independently of a second terminal unit that that receives the communication data and includes the application program, and where the second terminal unit is configured so that the second party can access the communication data using the second terminal unit independently of the first terminal unit.

19. A computer-implemented method for handling a voice communication in an integrated system and between a first party and a second party, the method comprising:
receiving information indicating that the voice communication is to be initiated;
identifying one of a plurality of terminal assignment records as being associated with the second party, each of the terminal assignment records configured to specify, for a particular party, at least one of a plurality of terminal units for receiving an alert to the particular party regarding the voice communication;
generating at least one alert to the second party according to the identified terminal assignment record, the at least one alert based on the received information;
forwarding communication data to an application program available to the second party, the communication data obtained from the received information; and
initiating the voice communication between the first party and the second party, wherein the second party communicates using a first terminal unit receiving the at least one alert,
wherein a second terminal unit receiving the at least one alert includes the application program, where the second party answers the voice communication using the first terminal unit independently of the second terminal unit, and where the second terminal unit is configured so that the second party can access the communication data using the second terminal unit independently of the first terminal unit.

20. A system for handling a voice communication in an integrated system and between a first party and a second party, the system comprising:
a server device including:
an interface to a voice communication network, the interface configured to receive information indicating that the voice communication is to be initiated;
a plurality of terminal assignment records, each associated with an individual party, wherein the server device identifies, in response to the information, at least one of the plurality of terminal assignment records as being associated with the second party, each terminal assignment record configured to specify, for the individual party, a party-specific plurality of terminal units from a plurality of terminal units that are operable to receive alerts regarding voice communications and that are configured for use in the voice communications, each of the party-specific plurality of terminal units for receiving an alert to the individual party regarding the voice communication; and
an interface to the plurality of terminal units configured for transmitting at least one alert to the second party according to the identified terminal assignment record, the at least one alert based on the received information, and for forwarding communication data to an application program available to the second party, the communication data obtained from the received information,
wherein the interface to the plurality of terminal units is operable to receive packetized voice information from a first terminal unit from the second party's party-specific plurality of terminal units and depacketized voice information from a second terminal unit from the second party's party-specific plurality of terminal units.

21. A system for handling a voice communication in an integrated system and between a first party and a second party, the system comprising:
a server device including:
an interface to a voice communication network, the interface configured to receive information indicating that the voice communication is to be initiated;
a plurality of terminal assignment records, each associated with an individual party, wherein the server device identifies, in response to the information, at least one of the plurality of terminal assignment records as being associated with the second party, each terminal assignment record configured to specify, for the individual party, a party-specific plurality of terminal units from a plurality of terminal units that are operable to receive alerts regarding voice communications and that are configured for use in the voice communications, each of the party-specific plurality of terminal units for receiving an alert to the individual party regarding the voice communication; and
an interface to the plurality of terminal units configured for transmitting at least one alert to the second party according to the identified terminal assignment record, the at least one alert based on the received information, and for forwarding communication data to an application program available to the second party, the communication data obtained from the received information,
wherein the server device is further configured to initiate the voice communication between the first party and the second party, wherein the second party communicates using a first terminal unit receiving a first alert transmitted by the interface.

22. A system for handling a voice communication in an integrated system and between a first party and a second party, the system comprising:
a server device including:
an interface to a voice communication network, the interface configured to receive information indicating that the voice communication is to be initiated;
a plurality of terminal assignment records, each associated with an individual party, wherein the server device identifies, in response to the information, at least one of the plurality of terminal assignment records as being associated with the second party, each terminal assignment record configured to specify, for the individual party, a party-specific plurality of terminal units from a plurality of terminal units that are operable to receive alerts regarding voice communications and that are configured for use in the voice communications, each of the party-specific plurality of terminal units for receiving an alert to the individual party regarding the voice communication; and an interface to the plurality of terminal units configured for transmitting at least one alert to the second party according to the identified terminal assignment record, the at least one alert based on the received information, and for forwarding communication data to an application program available to the second party, the communication data obtained from the received information, wherein the server device is further configured to receive an answer signal from an answering terminal unit receiving the at least one alert transmitted by the interface, where the answer signal is initiated by the second party, and in response to receiving the answer signal, initiate the voice communication between the answering terminal unit and the first party.

23. A computer-implemented method for handling a voice communication in an integrated system and between a first party and a second party, the method comprising:

receiving information indicating that the voice communication is to be initiated;

identifying one of a plurality of terminal assignment records as being associated with the second party, each of the terminal assignment records configured to specify, for a particular party, at least one of a plurality of terminal units for receiving an alert to the particular party regarding the voice communication;

generating at least one alert to the second party according to the identified terminal assignment record, the at least one alert based on the received information; and forwarding communication data to an application program available to the second party, the communication data obtained from the received information, wherein a first terminal unit receiving the at least one alert includes the application program and is configured so that the second party can answer the voice communication using the first terminal unit and at the same time access the communication data using the first terminal unit.

24. A computer-implemented method for handling a voice communication in an integrated system and between a first party and a second party, the method comprising:

receiving information indicating that the voice communication is to be initiated;

identifying one of a plurality of terminal assignment records as being associated with the second party, each of the terminal assignment records configured to specify, for a particular party, at least one of a plurality of terminal units for receiving an alert to the particular party regarding the voice communication;

generating at least one alert to the second party according to the identified terminal assignment record, the at least one alert based on the received information;

forwarding communication data to an application program available to the second party, the communication data obtained from the received information; and receiving an answer signal from an answering terminal unit receiving the at least one alert, where the answer signal is initiated by the second party, and in response to receiving the answer signal, initiating the voice communication between the answering terminal unit and the first party.

25. A computer program product tangibly embodied in a non-transitory computer-readable storage medium and comprising instructions that when executed by a processor perform a method for handling a voice communication in an integrated system and between a first party and a second party, the method comprising:

receiving information indicating that the voice communication is to be initiated;

identifying one of a plurality of terminal assignment records as being associated with the second party, each of the terminal assignment records configured to specify, for a particular party, at least one of a plurality of terminal units for receiving an alert to the particular party regarding the voice communication;

generating at least one alert to the second party according to the identified terminal assignment record, the at least one alert based on the received information;

forwarding communication data to an application program available to the second party, the communication data obtained from the received information; and initiating the voice communication between the first party and the second party, where a second terminal unit receiving the at least one alert includes the application program, where the second party answers the voice communication independently of the second terminal unit using a first terminal unit receiving the at least one alert, and where the second terminal unit is configured so that the second party can access the communication data using the second terminal unit independently of the first terminal unit.

26. A system for handling a voice communication in an integrated system and between a first party and a second party, the system comprising:

a server device including:

an interface to a voice communication network, the interface configured to receive information indicating that the voice communication is to be initiated;

a plurality of terminal assignment records, each associated with an individual party, wherein the server device identifies, in response to the information, at least one of the plurality of terminal assignment records as being associated with the second party, each terminal assignment record configured to specify, for the individual party, a party-specific plurality of terminal units from a plurality of terminal units that are operable to receive alerts regarding voice communications and that are configured for use in the voice communications, each of the party-specific plurality of terminal units for receiving an alert to the individual party regarding the voice communication; and an interface to the plurality of terminal units configured for transmitting at least one alert to the second party according to the identified terminal assignment record, the at least one alert based on the received information, and for forwarding communication data to an application program available to the second party, the communication data obtained from the received information, wherein a first terminal unit receiving the at least one alert transmitted by the interface includes the application program and is configured so that the second party can answer the voice communication using the first terminal unit and at the same time access the communication data using the first terminal unit.

* * * * *